(12) United States Patent
Ashjaee et al.

(10) Patent No.: US 8,717,232 B2
(45) Date of Patent: May 6, 2014

(54) HANDHELD GLOBAL POSITIONING SYSTEM DEVICE

(75) Inventors: Javad Ashjaee, Saratoga, CA (US); Lev B. Rapoport, Moscow (RU); Mikhail Gribkov, Moscow (RU); Alexander I. Gribkov, Moscow (RU)

(73) Assignee: Javad GNSS, Inc., San Jose, CA (US)

( * ) Notice: Subject to any disclaimer, the term of this patent is extended or adjusted under 35 U.S.C. 154(b) by 0 days.

(21) Appl. No.: 13/353,220

(22) Filed: Jan. 18, 2012

(65) Prior Publication Data

US 2012/0188122 A1 Jul. 26, 2012

Related U.S. Application Data

(62) Division of application No. 12/871,705, filed on Aug. 30, 2010, now Pat. No. 8,125,376.

(51) Int. Cl.
*G01S 19/40* (2010.01)
*G01S 19/47* (2010.01)
*G01S 19/51* (2010.01)
*G01S 19/14* (2010.01)

(52) U.S. Cl.
USPC .............. 342/357.23; 342/357.3; 342/357.34; 342/357.52

(58) Field of Classification Search
USPC ............... 342/357.52, 357.34, 357.3, 357.24, 342/357.44; 348/116, 135–142; 382/106, 382/275, 286–287; 356/4.03, 20
See application file for complete search history.

(56) References Cited

U.S. PATENT DOCUMENTS

| 5,471,218 | A | 11/1995 | Talbot et al. |
| 5,528,518 | A | 6/1996 | Bradshaw et al. |
| 5,734,337 | A | 3/1998 | Kupersmit |
| 5,913,078 | A | 6/1999 | Kimura et al. |
| 6,083,353 | A * | 7/2000 | Alexander, Jr. ............... 382/276 |

(Continued)

FOREIGN PATENT DOCUMENTS

| EP | 1189021 A1 | 3/2002 |
| EP | 2312330 A1 | 4/2011 |
| WO | 2006/070047 A1 | 7/2006 |

OTHER PUBLICATIONS

Extended European Search Report and Search Opinion received for European Patent Application No. 12186129.8, mailed on Feb. 6, 2013, 6 pages.

(Continued)

*Primary Examiner* — Jack W Keith
*Assistant Examiner* — Fred H Mull
(74) *Attorney, Agent, or Firm* — Morrison & Foerster LLP

(57) ABSTRACT

A handheld GNSS device includes a housing, handgrips integral to the housing for enabling a user to hold the device, and a display screen integral with the housing. The device has a GNSS antenna and a communication antenna, both integral with the housing. The GNSS antenna receives position data from GNSS satellites. The communication antenna receives positioning assistance data from a base station. The GNSS antenna has a first antenna pattern, and the communication antenna has a second antenna pattern. The first and second antenna patterns are substantially separated. Coupled to the GNSS antenna, within the housing, is at least one receiver. Further, the device includes, within the housing, orientation circuitry for generating orientation data, imaging circuitry for obtaining image data, and positioning circuitry for determining a position for the point of interest based on the position data, the positioning assistance data, the orientation data, and the image data.

21 Claims, 12 Drawing Sheets

(56) References Cited

U.S. PATENT DOCUMENTS

| | | | |
|---|---|---|---|
| 6,522,292 | B1 | 2/2003 | Ellenby et al. |
| 6,735,522 | B2 | 5/2004 | Mori |
| 6,810,293 | B1 | 10/2004 | Chou et al. |
| 6,906,664 | B2 | 6/2005 | Tseng et al. |
| 6,947,820 | B2 | 9/2005 | Ohtomo et al. |
| 7,471,249 | B2 | 12/2008 | Tang et al. |
| 7,646,339 | B2 | 1/2010 | Green et al. |
| 7,764,365 | B2 | 7/2010 | Nichols et al. |
| 8,089,549 | B2 | 1/2012 | Yasuda et al. |
| 2003/0090415 | A1 | 5/2003 | Miyasaka et al. |
| 2004/0202292 | A1* | 10/2004 | Cook ................... 342/357.07 |
| 2004/0239558 | A1* | 12/2004 | Geier et al. ............ 342/357.06 |
| 2004/0257441 | A1 | 12/2004 | Pevear et al. |
| 2005/0001763 | A1* | 1/2005 | Han et al. ............. 342/357.04 |
| 2005/0094741 | A1* | 5/2005 | Kuroda ....................... 375/267 |
| 2006/0114164 | A1 | 6/2006 | Iluz et al. |
| 2006/0256007 | A1 | 11/2006 | Rosenberg |
| 2006/0259574 | A1 | 11/2006 | Rosenberg |
| 2007/0018890 | A1* | 1/2007 | Kulyukin ............... 342/357.14 |
| 2007/0206175 | A1* | 9/2007 | Rai et al. ................... 356/4.03 |
| 2007/0229797 | A1* | 10/2007 | Sugimoto ................. 356/4.03 |
| 2007/0288197 | A1 | 12/2007 | Martin |
| 2008/0158044 | A1 | 7/2008 | Talbot et al. |
| 2008/0208454 | A1 | 8/2008 | Pesterev et al. |
| 2009/0030612 | A1* | 1/2009 | Hayashi et al. ............... 701/216 |
| 2009/0082139 | A1* | 3/2009 | Hart ....................... 342/357.08 |
| 2009/0098880 | A1* | 4/2009 | Lindquist ............... 342/357.07 |
| 2009/0189804 | A1 | 7/2009 | Ashjaee et al. |
| 2009/0222237 | A1 | 9/2009 | Otani et al. |
| 2010/0008515 | A1 | 1/2010 | Fulton et al. |
| 2010/0008543 | A1 | 1/2010 | Yamada |
| 2010/0033371 | A1 | 2/2010 | Kumagai et al. |
| 2010/0070162 | A1 | 3/2010 | Aihara |
| 2011/0066375 | A1 | 3/2011 | France et al. |
| 2011/0075886 | A1 | 3/2011 | Ashjaee et al. |

OTHER PUBLICATIONS

Office Action received for European Patent Application No. 10183800.1, mailed on Dec. 30, 2011, 3 pages.
Office Action received for European Patent Application No. 10183800.1, mailed on Jul. 5, 2012, 4 pages.
Extended European Search Report Received for European Patent Application No. 10183800.1, mailed on Dec. 3, 2010, 6 Pages.
Extended European Search Report and Search Opinion received for European Patent Application No. 11179395.6, mailed on Dec. 1, 2011, 8 pages.
Extended European Search Report received for European Patent Application No. 11189979.5, mailed on Feb. 27, 2012, 4 pages.
Non Final Office Action received for U.S. Appl. No. 12/571,244, mailed on Jul. 20, 2012, 59 pages.
Notice of Allowance received for U.S. Appl. No. 12/871,705, mailed on Oct. 20, 2011, 13 pages.
Office Action received for European Patent Application No. 11179395.6, mailed on Jan. 7, 2013, 4 pages.
Final Office Action received for U.S. Appl. No. 12/571,244, mailed on Feb. 28, 2013, 60 pages.
Non-Final Office Action received for U.S. Appl. No. 12/571,244, mailed on Dec. 9, 2013, 68 pages.
Non-Final Office Action received for U.S. Appl. No. 13/301,669, mailed on Dec. 16, 2013, 43 pages.

* cited by examiner

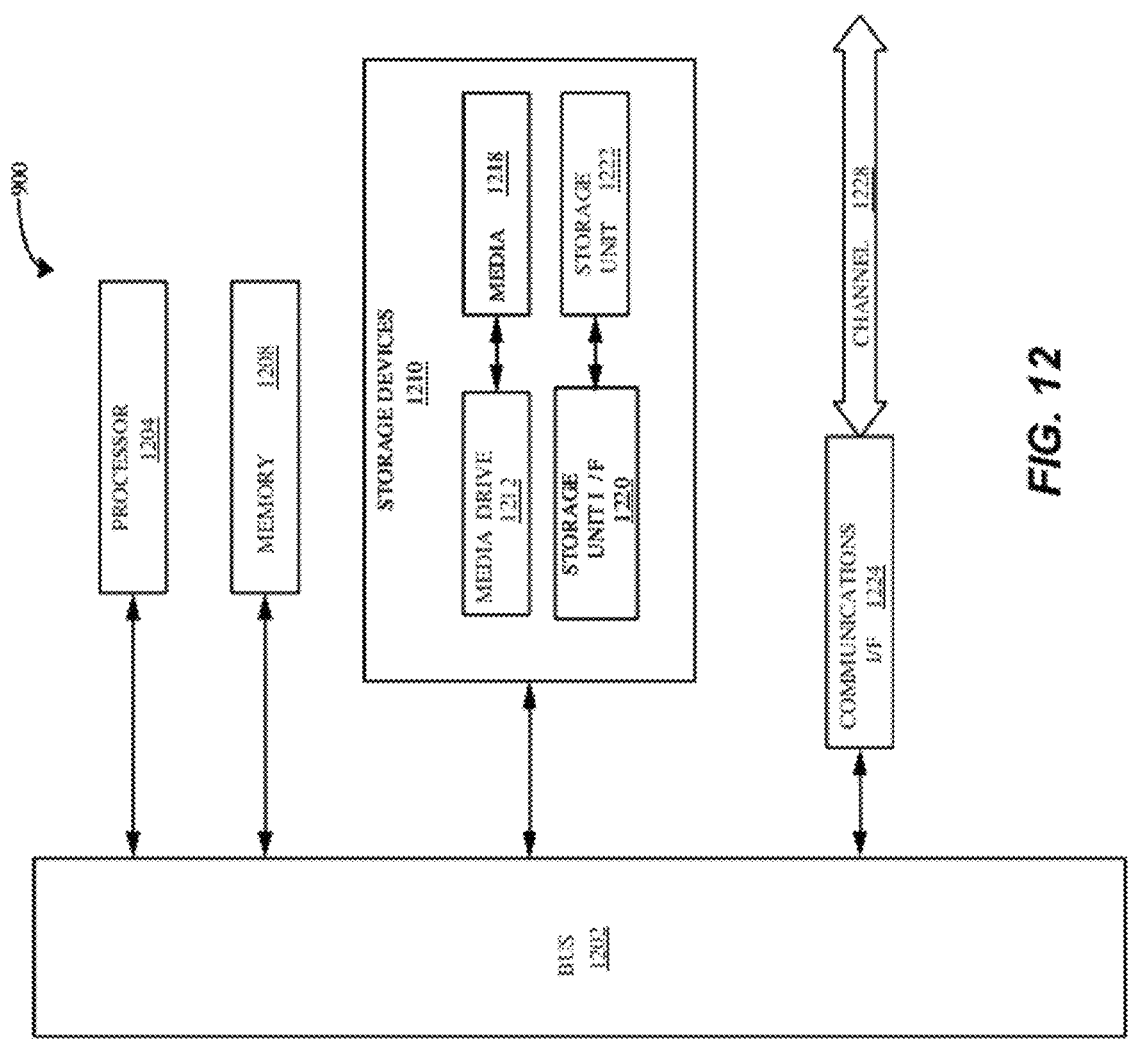

HANDHELD GLOBAL POSITIONING SYSTEM DEVICE

CROSS-REFERENCE TO RELATED APPLICATIONS

This application is a Divisional of U.S. patent application Ser. No. 12/871,705, filed Aug. 30, 2010, the disclosure of which is incorporated herein by reference in its entirety.

FIELD OF THE INVENTION

The present invention relates to a portable Global Navigation Satellite System (GNSS), including Global Positioning System (GPS), GLONASS, Galileo, and other satellite navigation and positioning systems.

BACKGROUND OF THE INVENTION

Today, the number of applications utilizing GNSS information is rapidly increasing. For example, GNSS information is a valuable tool for geodesists. Geodesists commonly use GNSS devices to determine the location of a point of interest anywhere on, or in the vicinity of, the Earth. Often, these points of interest are located at remote destinations which are difficult to access. Thus, compact, easy-to-carry positioning devices are desired.

GNSS receivers work by receiving data from GNSS satellites. To achieve millimeter and centimeter level accuracy, at least two GNSS receivers are needed. One receiver is positioned at a site where the position is known. A second receiver is positioned at a site whose position needs to be determined. The measurement from the first receiver is used to correct GNSS system errors at the second receiver. In post-processed mode, the data from both receivers can be stored and then transferred to a computer for processing. Alternatively, the corrections from the first receiver, the known receiver, may be transmitted in real time (via radio modems, Global System for Mobile Communications (GSM), etc.) to the unknown receiver, and the accurate position of the unknown receiver determined in real time.

A GNSS receiver typically includes a GNSS antenna, a signal processing section, a display and control section, a data communications section (for real-time processing), a battery, and a charger. Some degree of integration of these sections is usually desired for a handheld portable unit.

Another challenge of portable GNSS units is precisely positioning a GNSS antenna on the point of interest for location measurement. Previously, bulky equipment such as a separate tripod or other external hardware was used to "level" the antenna. In other systems, light low-precision antennas were used. Such devices are bulky and difficult to carry. Thus, even as portable GNSS positioning devices become more compact, they suffer from the drawback of requiring additional bulky positioning equipment.

Thus, for high-precision applications, the use of multiple units to house the various components required for prior GNSS systems, and the requirement for cables and connectors to couple the units, creates problems regarding portability, reliability, and durability. In addition, the systems are expensive to manufacture and assemble.

Therefore, a high precision, portable, complete handheld GNSS device that overcomes these disadvantages of conventional devices is desired.

BRIEF SUMMARY OF THE DISCLOSURE

Embodiments of the present disclosure are directed to a handheld GNSS device for determining position data for a point of interest. The device includes a housing, handgrips integral to the housing for enabling a user to hold the device, and a display screen integral with the housing for displaying image data and orientation data to assist a user in positioning the device. The device further includes a GNSS antenna and at least one communication antenna, both integral with the housing. The GNSS antenna receives position data from a plurality of satellites. One or more communication antennas receive positioning assistance data related to the position data from a base station. The GNSS antenna has a first antenna pattern, and the at least one communication antenna has a second antenna pattern. The GNSS antenna and the communication antenna(s) are configured such that the first and second antenna patterns are substantially separated.

Coupled to the GNSS antenna, within the housing, is at least one receiver. Further, the device includes, within the housing, orientation circuitry for generating orientation data of the housing based upon a position of the housing related to the horizon, imaging circuitry for obtaining image data concerning the point of interest for display on the display screen, and positioning circuitry, coupled to the at least one receiver, the imaging circuitry, and the orientation circuitry, for determining a position for the point of interest based on at least the position data, the positioning assistance data, the orientation data, and the image data. The device may further include a monopod connector, a shoulder strap, a headset, a speaker, and a microphone. The imaging circuitry and the microphone may begin operating without a user input. The microphone may be operable for recording voice comments from the user.

BRIEF DESCRIPTION OF THE DRAWINGS

FIG. 12 illustrates a typical computing system that may be employed to implement some or all of the processing functionality in certain embodiments.

In the following description, reference is made to the accompanying drawings which form a part thereof, and which illustrate several embodiments of the present invention. It is understood that other embodiments may be utilized and structural and operational changes may be made without departing from the scope of the present invention. The use of the same reference symbols in different drawings indicates similar or identical items.

DETAILED DESCRIPTION OF THE INVENTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention as claimed. Thus, the various embodiments are not intended to be limited to the examples described herein and shown, but are to be accorded the scope consistent with the claims.

Embodiments of the invention relate to mounting a GNSS antenna and communication antennas in a single housing. The communication antennas are for receiving differential correction data from a fixed or mobile base transceiver, as described in U.S. patent application Ser. No. 12/360,808, assigned to the assignee of the present invention, and incorporated herein by reference in its entirety for all purposes. Differential correction data may include, for example, the difference between measured satellite pseudo-ranges and actual pseudo-ranges. This correction data received from a base station may help to eliminate errors in the GNSS data received from the satellites. Alternatively, or in addition, the communication antenna may receive raw range data from a moving base transceiver. Raw positioning data received by the communication antenna may be, for example, coordinates of the base and other raw data, such as the carrier phase of a satellite signal received at the base transceiver and the pseudo-range of the satellite to the base transceiver.

Additionally, a second navigation antenna may be connected to the handheld GNSS device to function as the primary navigation antenna if the conditions and/or orientation do not allow the first GNSS antenna to receive a strong GNSS signal.

Figure 1:
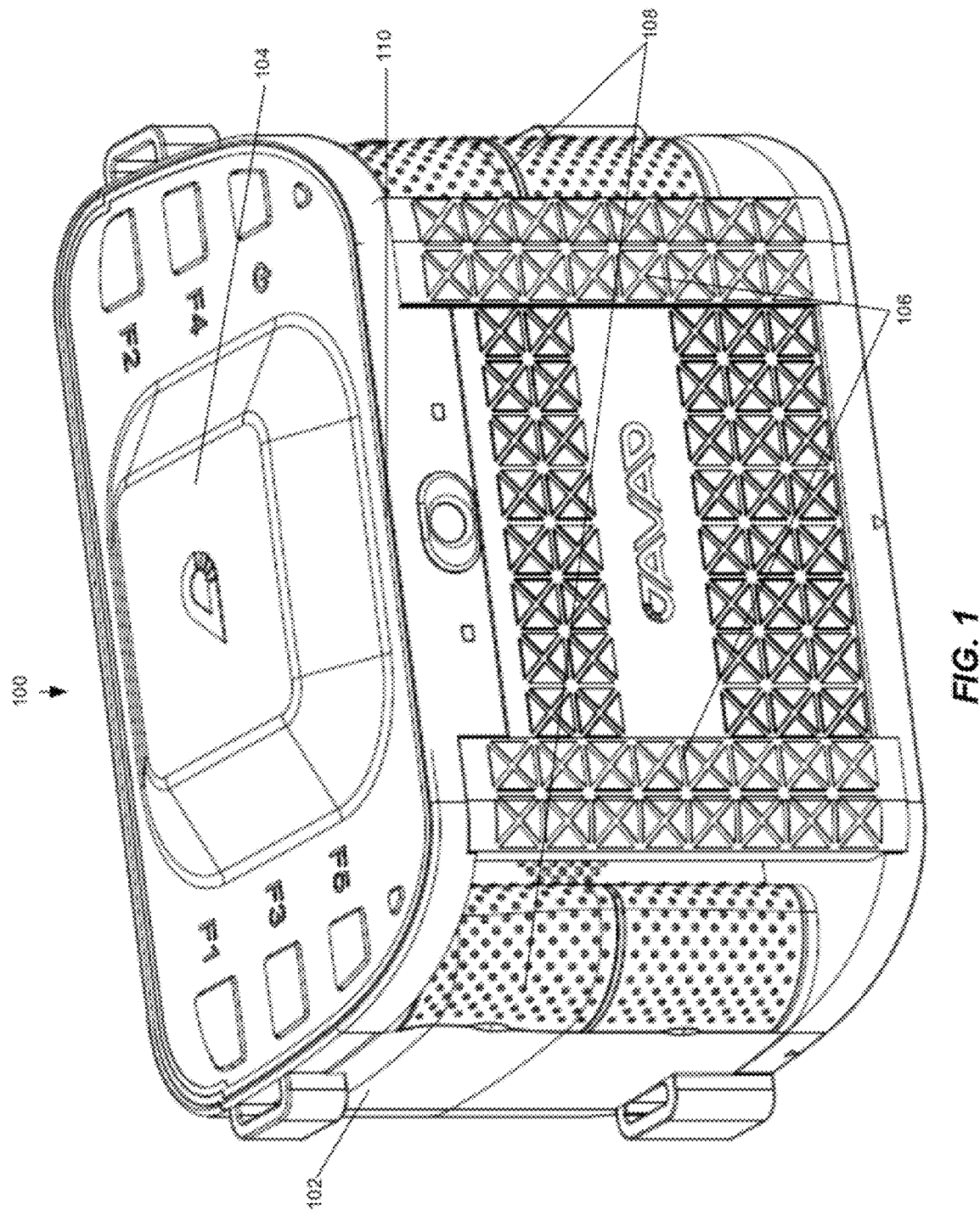
FIG. 1 illustrates a perspective view of a handheld GNSS device according to embodiments of the invention.

The communication antenna is configured such that its antenna pattern is substantially separated from the antenna pattern of the GNSS antenna such that there is minimal or nearly minimal mutual interference between the antennas. As used herein, "substantial" separation may be achieved by positioning the communication antenna below the main ground plane of the GNSS antenna, as shown in FIG. 1. According to embodiments of the invention, a substantial separation attenuates interference between the communication antenna and the GNSS antenna by as much as 40 dB. Furthermore, the communication antenna and the GNSS antenna are positioned such that the body of the user holding the GNSS device does not substantially interfere with the GNSS signal.

Moreover, as mentioned above, to properly measure the position of a given point using a GNSS-based device, the GNSS antenna must be precisely positioned so that the position of the point of interest may be accurately determined. To position a GNSS device in such a manner, external hardware, such as a tripod, is commonly used. Such hardware is bulky and difficult to carry. Thus, according to embodiments of the invention, compact positioning tools, included in the single unit housing, are useful for a portable handheld GNSS device.

As such, various embodiments are described below relating to a handheld GNSS device. The handheld GNSS device may include various sensors, such as a camera, distance sensor, and horizon sensors. A display element may also be included for assisting a user to position the device without the aid of external positioning equipment (e.g., a tripod or pole).

FIG. 1 illustrates an exemplary handheld GNSS device 100. Handheld GNSS device 100 utilizes a single housing 102. Several GNSS elements are integral to the housing 102 in that they are within the housing or securely mounted thereto. A securely mounted element may be removable. Housing 102 allows the user to hold the handheld GNSS device 100 similar to the way one would hold a typical camera. In one example, the housing 102 may include GNSS antenna cover 104 to cover a GNSS antenna 802 (shown in FIG. 8) which may receive signals transmitted by a plurality of GNSS satellites and used by handheld GNSS device 100 to determine position. The GNSS antenna 802 is integral with the housing 102 in that it resides in the housing 102 under the GNSS antenna cover 104.

Figure 5:
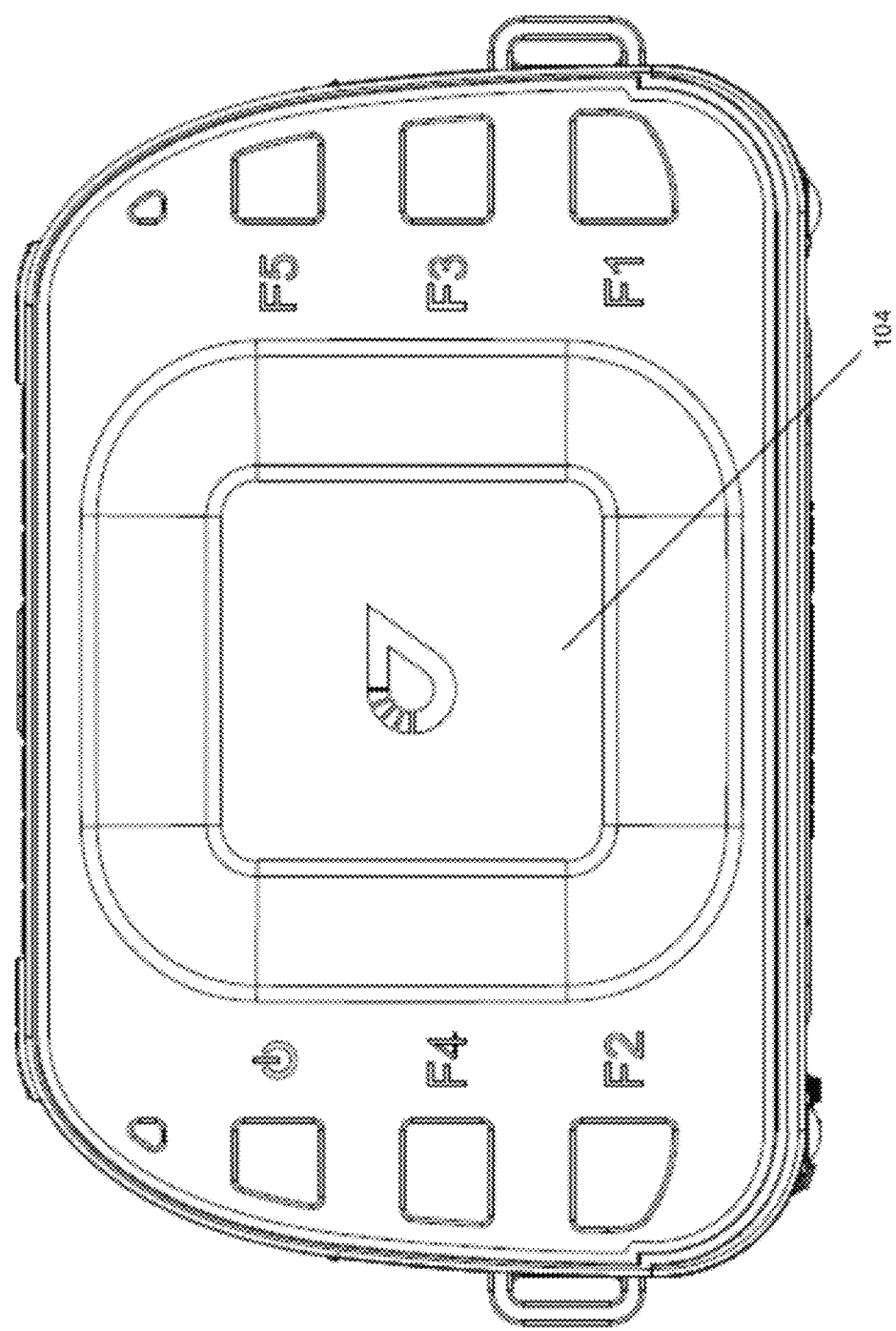
FIG. 5 illustrates a top view of a handheld GNSS device according to embodiments of the invention.

In one example, GNSS antenna 802 may receive signals transmitted by at least four GNSS satellites. In the example shown by FIG. 1, GNSS antenna cover 104 is located on the top side of handheld GNSS device 100. An exemplary top side view of the handheld GNSS device 100 is illustrated in FIG. 5.

Handheld GNSS device 100 further includes covers for communication antennas 106 integral with the housing 102. In embodiments of the invention there may be three such communication antennas, including GSM, UHF, and WiFi/Bluetooth antennas enclosed beneath covers for the communication antennas 106.

Figure 8:
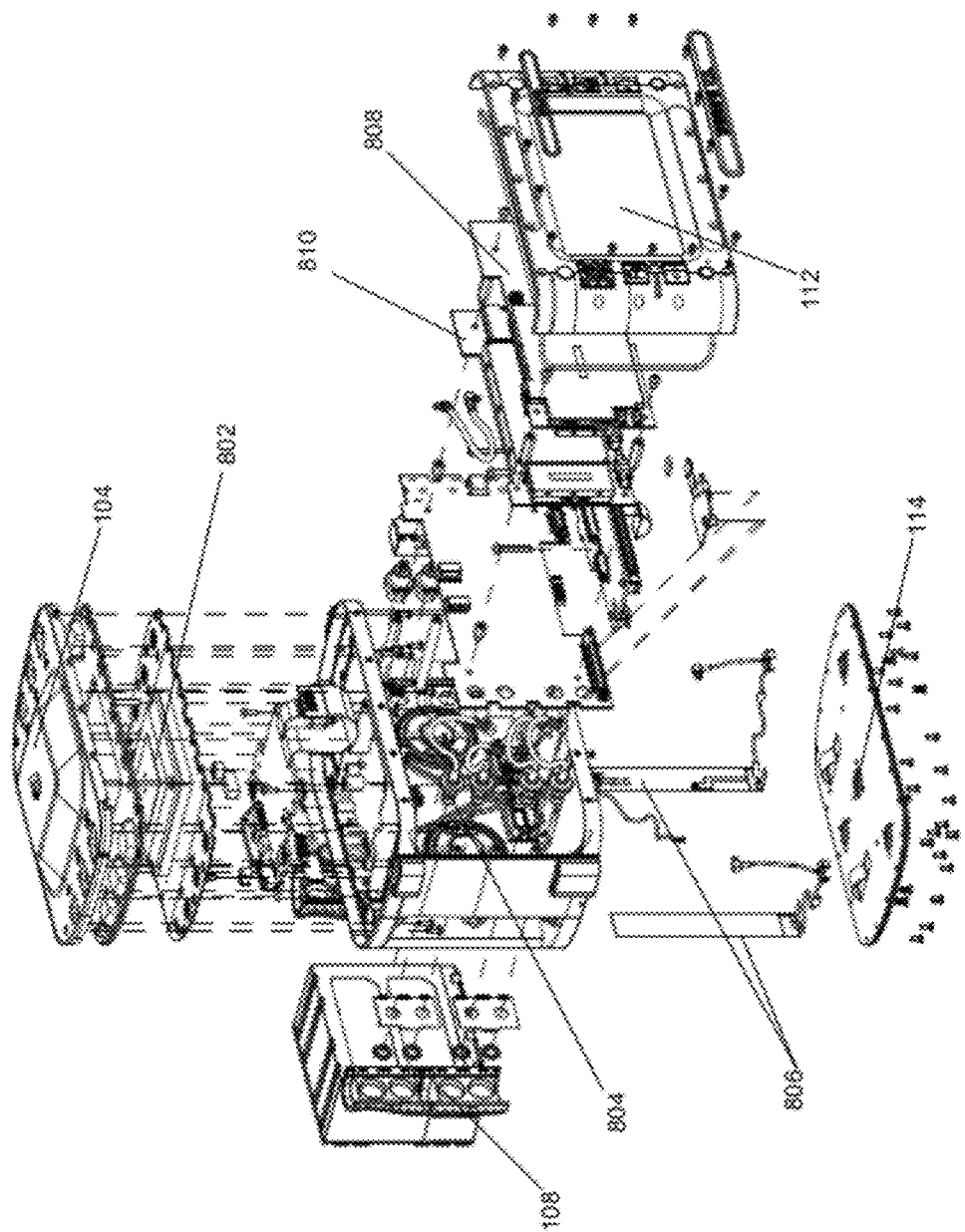
FIG. 8 illustrates an exploded view of a handheld GNSS device including a viewfinder for a camera according to embodiments of the invention.

An exemplary exploded view of handheld GNSS device 100 is shown in FIG. 8. Communication antennas 806 are positioned beneath the covers 106. The GSM and UHF antennas may be only one-way communication antennas. In other words, the GSM and UHF antenna may only be used to receive signals, but not transmit signals. The WiFi antenna may allow two-way communication. The communication antennas 806 receive positioning assistance data, such as differential correction data or raw positioning data from base transceivers.

In the example shown in FIG. 1, the GNSS antenna cover 104 is located on the top of the housing 102. In the same example of FIG. 1, the communication antenna covers 106 are located on the front of the housing 102.

Handheld GNSS device 100 may further include at least one handgrip 108. In the example shown in FIG. 1, two handgrips 108 are integral to the housing 102. The handgrips 108 may be covered with a rubber material for comfort and to reduce slippage of a user's hands.

Figure 7:
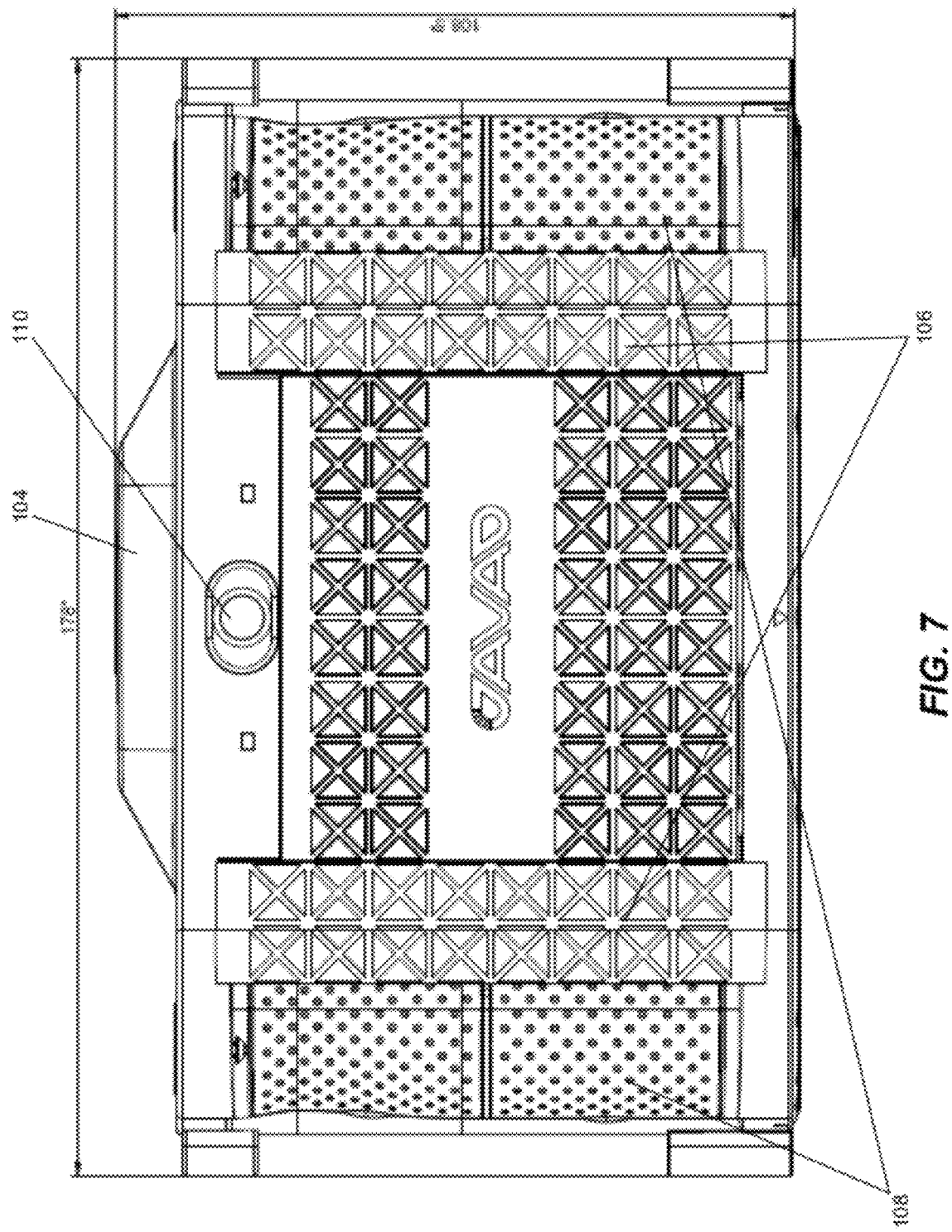
FIG. 7 illustrates a front view of a handheld GNSS device including a viewfinder for a camera according to embodiments of the invention.

The GNSS antenna cover 104, the communication antenna covers 106 and the handgrips 108 are shown from another view in the exemplary front view illustrated in FIG. 7. A front camera lens 110 is located on the front side of the handheld GNSS device 100. A second bottom camera lens 116 may be located on the bottom side of the handheld GNSS device 100 in the example shown in FIG. 4. The camera included may be a still or video camera.

Figure 6:
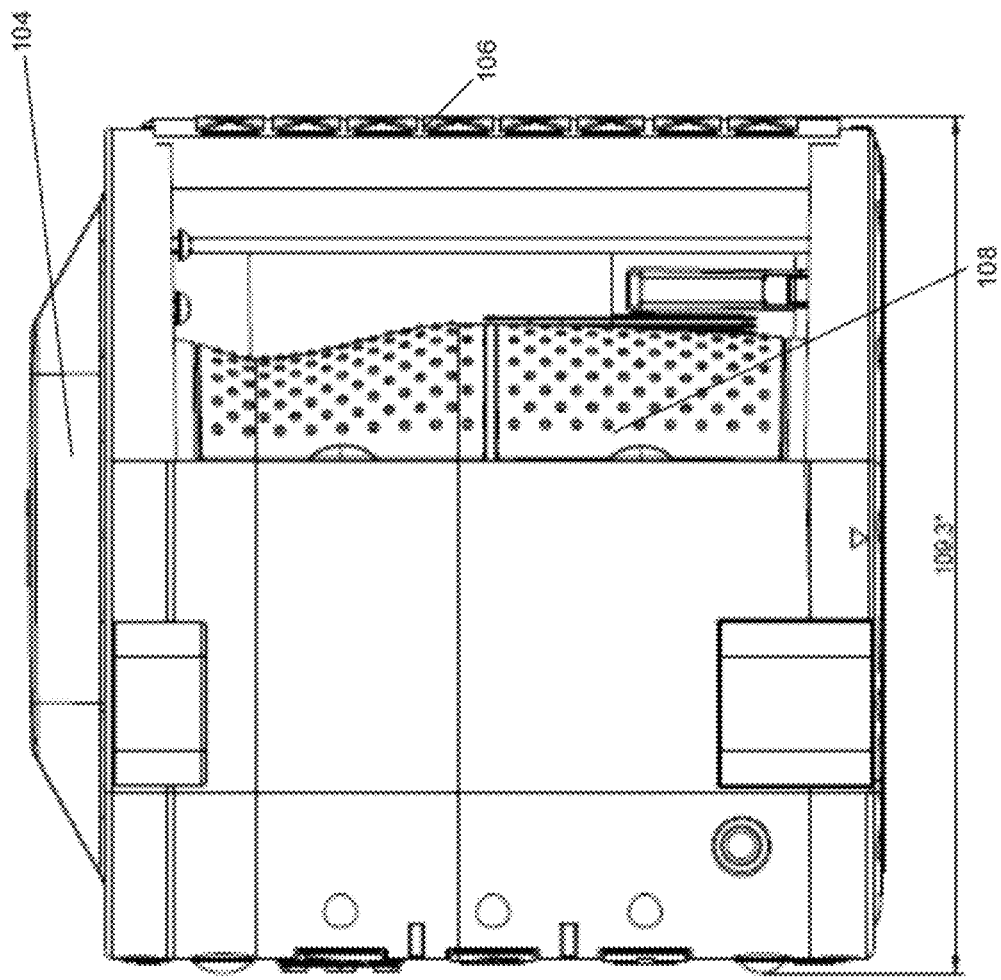
FIG. 6 illustrates a side view of a handheld GNSS device including handgrips for a user according to embodiments of the invention.

The handgrips 108, in certain embodiments, may also be positioned to be near to the communication antenna covers 106. Handgrips 108 are shown in a position, as in FIG. 6, that, when a user is gripping the handgrips 108, the user minimally interferes with the antenna patterns of GNSS antenna 802 and communication antennas 806. For example, the user's hands do not cause more than −40 dB of interference while gripping the handgrips 108 in this configuration, e.g., with the handgrips 108 behind and off to the side of the communication antenna covers 106.

Figure 2:
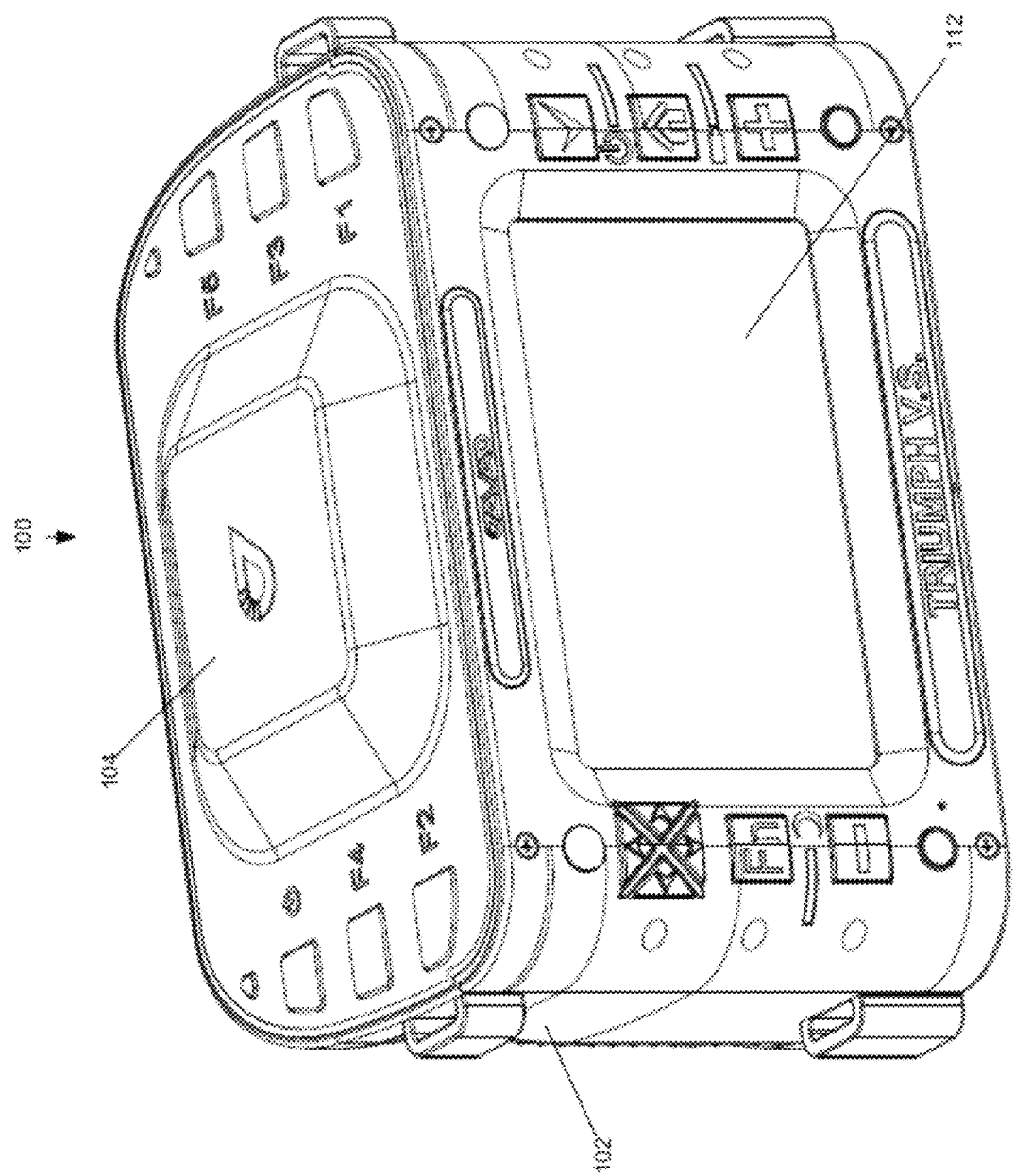
FIG. 2 illustrates another perspective view of a handheld GNSS device according to embodiments of the invention.
Figure 3:
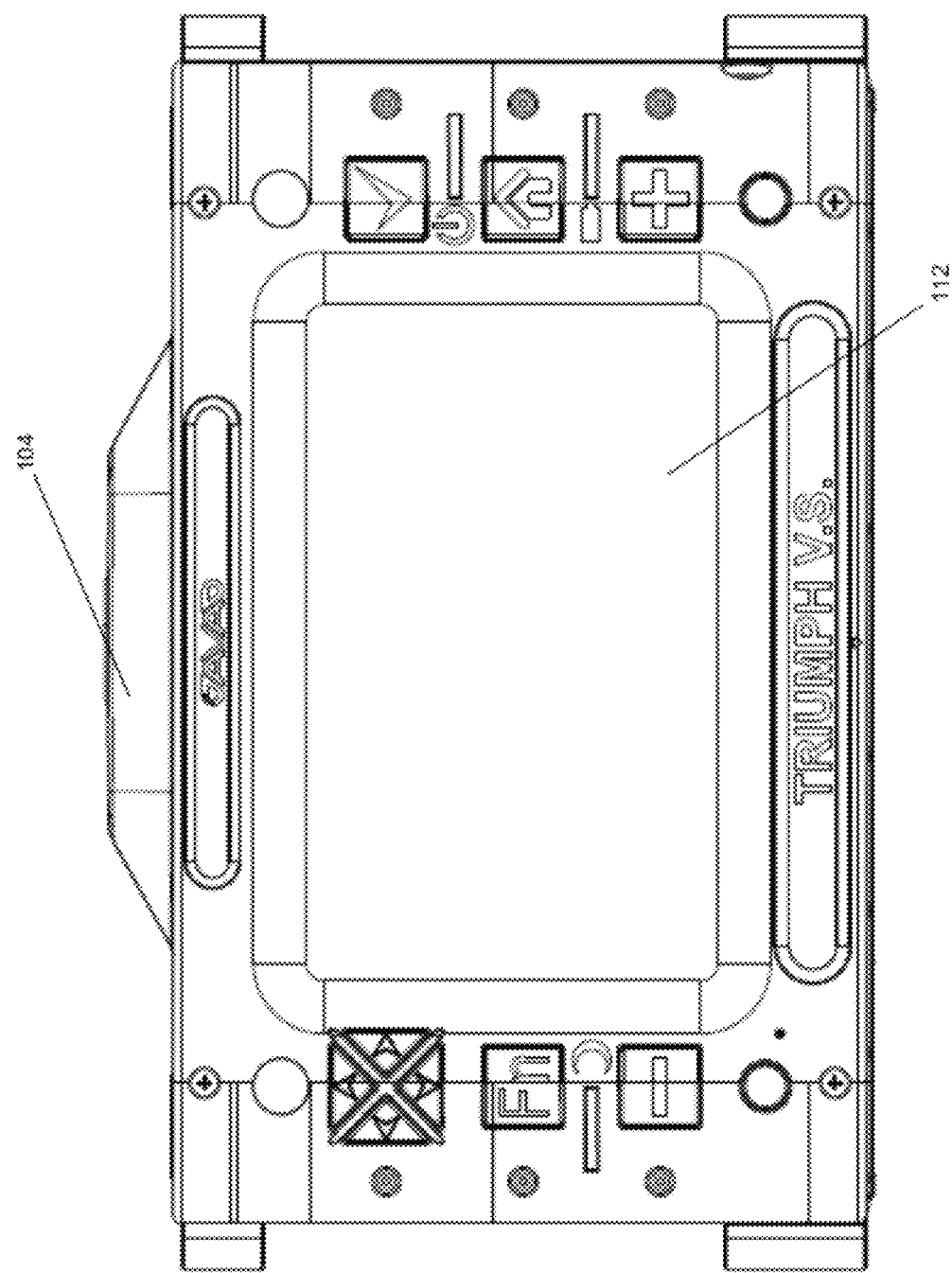
FIG. 3 illustrates a back view of a handheld GNSS device including a display screen for a user according to embodiments of the invention.

As shown in FIG. 2 and FIG. 3, handheld GNSS device 100 may further include display 112 for displaying information to assist the user in positioning the device. Display 112 may be any electronic display such as a liquid crystal (LCD) display, light emitting diode (LED) display, and the like. Such display devices are well-known by those of ordinary skill in the art and any such device may be used. In the example shown by FIG. 2, display 112 is integral with the back side of the housing 102 of handheld GNSS device 100.

Handheld GNSS device 100 may further include a camera for recording still images or video. Such recording devices are well-known by those of ordinary skill in the art and any such device may be used. In the example illustrated in FIG. 1, front camera lens 110 is located on the front side of handheld GNSS device 100. A more detailed description of the positioning of front camera lens 110 is provided in U.S. patent application Ser. No. 12/571,244, filed Sep. 30, 2009, which is incorporated herein by reference in its entirety for all purposes. In one example, display 112 may be used to display the output of front camera lens 110.

Figure 4:
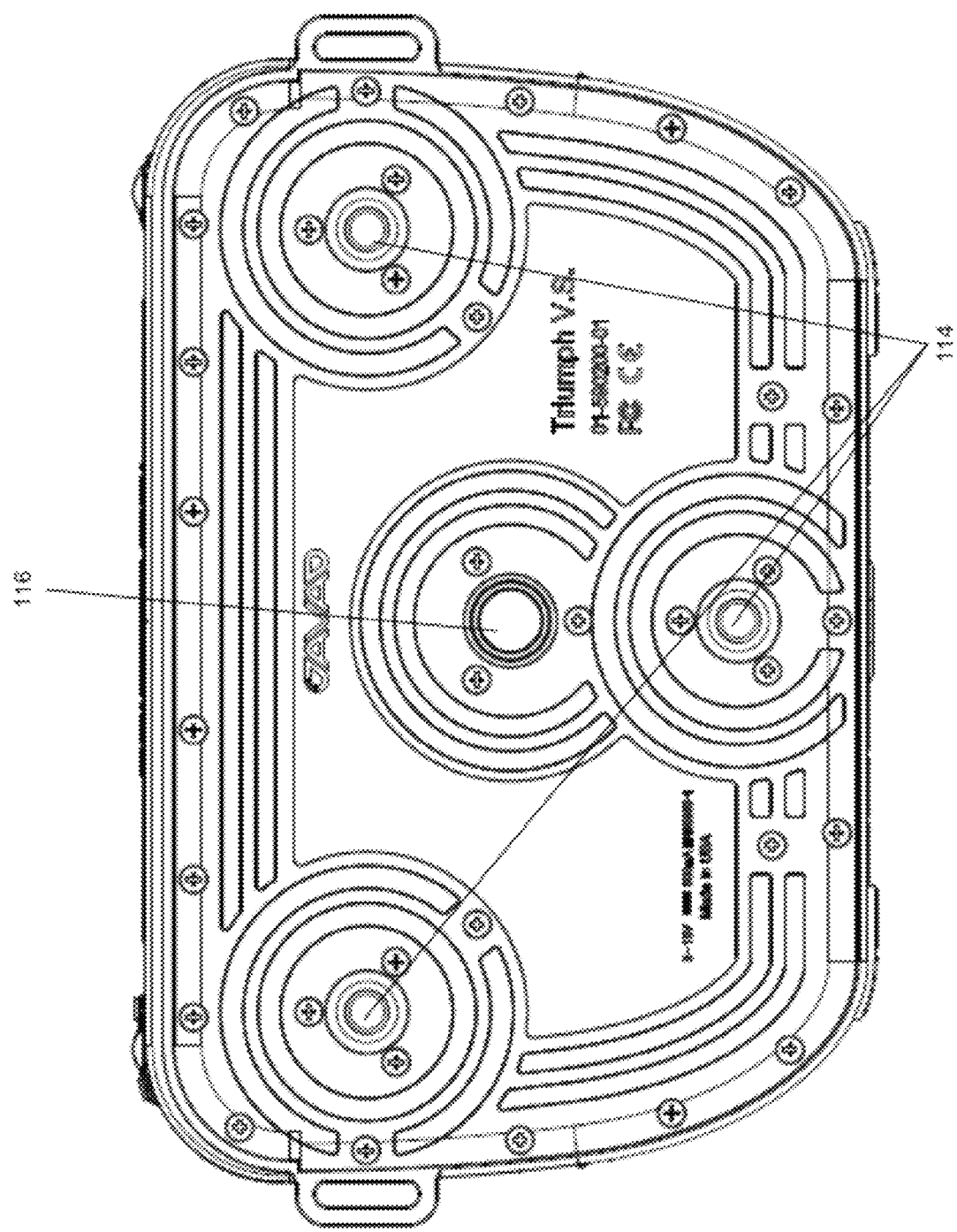
FIG. 4 illustrates a bottom view of a handheld GNSS device according to embodiments of the invention.

With reference to FIG. 4, handheld GNSS device 100 may also include a second bottom camera lens 116 on the bottom of handheld GNSS device 100 for viewing and alignment of the handheld GNSS device 100 with a point of interest marker. The image of the point of interest marker may also be recorded along with the GNSS data to ensure that the GNSS receiver 808 was mounted correctly, or compensate for misalignment later based on the recorded camera information.

Handheld GNSS device 100 may further include horizon sensors (not shown) for determining the orientation of the device. The horizon sensors may be any type of horizon sensor, such as an inclinometer, accelerometer, and the like. Such horizon sensors are well-known by those of ordinary skill in the art and any such device may be used. In one example, a representation of the output of the horizon sensors may be displayed using display 112. A more detailed description of display 112 is provided below. The horizon sensor information can be recorded along with GNSS data to later compensate for mis-leveling of the antenna.

Handheld GNSS device 100 may further include a distance sensor (not shown) to measure a linear distance. The distance sensor may use any range-finding technology, such as sonar, laser, radar, and the like. Such distance sensors are well-known by those of ordinary skill in the art and any such device may be used.

FIG. 4 illustrates a bottom view of the handheld GNSS device 100 according to embodiments of the invention. The handheld GNSS device 100 may be mounted on a tripod, or some other support structure, by a mounting structure such as three threaded bushes 114, in some embodiments of the invention.

FIG. 8 illustrates an exploded view of the handheld GNSS device 100. When assembled, GNSS antenna 802 is covered by the GNSS antenna cover 104, and the communication antennas 806 are covered by the communication antenna covers 106.

Figure 9A:
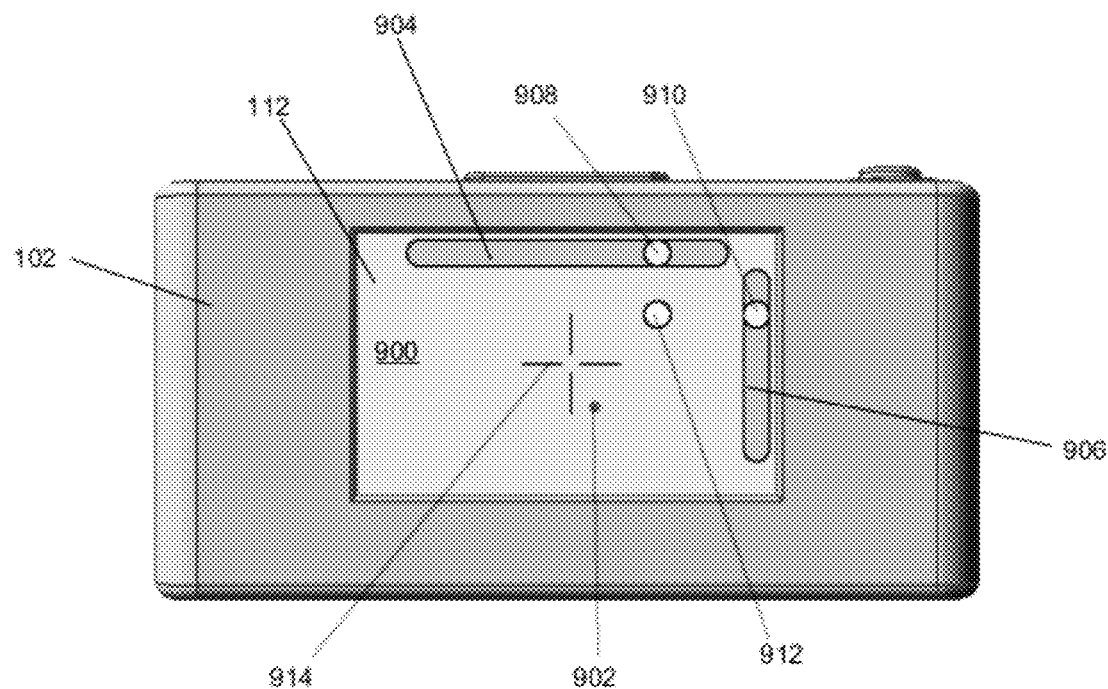
FIG. 9A illustrates an exemplary view of the display screen of a handheld GNSS device including elements used for positioning the device.

FIG. 9A illustrates an exemplary view 900 of display 112 for positioning handheld GNSS device 100. In one example, display 112 may display the output of camera. In this example, the display of the output of camera lens 116 or 110 includes point of interest marker 902. As shown in FIG. 9A, point of interest marker 902 is a small circular object identifying a particular location on the ground. In the examples provided herein, we assume that the location to be measured is located on the ground, and that the point of interest is identifiable by a visible marker (e.g., point of interest marker 902). The marker may be any object having a small height value. For instance, an "X" painted on the ground or a circular piece of colored paper placed on the point of interest may serve as point of interest marker 902.

In another example, display 112 may further include virtual linear bubble levels 904 and 906 corresponding to the roll and pitch of handheld GNSS device 100, respectively. Virtual linear bubble levels 904 and 906 may include virtual bubbles 908 and 910, which identify the amount and direction of roll and pitch of handheld GNSS device 100. Virtual linear bubble levels 904 and 906 and virtual bubbles 908 and 910 may be generated by a CPU 1108 and overlaid on the actual image output of the camera. In one example, positioning of virtual bubbles 908 and 910 in the middle of virtual linear bubble levels 904 and 906 indicate that the device is positioned "horizontally." As used herein, "horizontally" refers to the orientation whereby the antenna ground plane is parallel to the local horizon.

In one example, data from horizon sensors may be used to generate the linear bubble levels 904 and 906. For instance, sensor data from horizon sensors may be sent to CPU 1108 which may convert a scaled sensor measurement into a bubble coordinate within virtual linear bubble levels 904 and 906. CPU 1108 may then cause the display on display 112 of virtual bubbles 908 and 910 appropriately placed within virtual linear bubble levels 904 and 906. Thus, virtual linear bubble levels 904 and 906 may act like traditional bubble levels, with virtual bubbles 908 and 910 moving in response to tilting and rolling of handheld GNSS device 100. For example, if handheld GNSS device 100 is tilted forward, virtual bubble 908 may move downwards within virtual linear bubble level 906. Additionally, if handheld GNSS device 100 is rolled to the left, virtual bubble 908 may move to the right within virtual linear bubble level 904. However, since virtual linear bubble levels 904 and 906 are generated by CPU 1108, movement of virtual bubbles 908 and 910 may be programmed to move in any direction in response to movement of handheld GNSS device 100.

In another example, display 112 may further include planar bubble level 912. Planar bubble level 912 represents a combination of virtual linear bubble levels 904 and 906 (e.g., placed at the intersection of the virtual bubbles 908 and 910 within the linear levels 904 and 906) and may be generated by combining measurements of two orthogonal horizon sensors (not shown). For instance, scaled measurements of horizon sensors may be converted by CPU 1108 into X and Y coordinates on display 112. In one example, measurements from one horizon sensor may be used to generate the X coordinate and measurements from a second horizon sensor may be used to generate the Y coordinate of planar bubble level 912.

As shown in FIG. 9A, display 112 may further include central crosshair 914. In one example, central crosshair 914 may be placed in the center of display 112. In another example, the location of central crosshair 914 may represent the point in display 112 corresponding to the view of front camera lens 110 along optical axis 242. In yet another example, placement of planar bubble level 912 within central crosshair 914 may correspond to handheld GNSS device 100 being positioned horizontally. Central crosshair 914 may be drawn on the screen of display 112 or may be electronically displayed to display 112.

Display 112 may be used to aid the user in positioning handheld GNSS device 100 over a point of interest by providing feedback regarding the placement and orientation of the device. For instance, the camera output portion of display 112 provides information to the user regarding the placement of handheld GNSS device 100 with respect to objects on the ground. Additionally, virtual linear bubble levels 904 and 906 provide information to the user regarding the orientation of handheld GNSS device 100 with respect to the horizon. Using at least one of the two types of output displayed on display 112, the user may properly position handheld GNSS device 100 without the use of external positioning equipment.

In the example illustrated by FIG. 9A, both point of interest marker 902 and planar bubble level 912 are shown as off-center from central crosshair 914. This indicates that optical axis 242 of camera lens 110 or 116 is not pointed directly at the point of interest and that the device is not positioned horizontally. If the user wishes to position the device horizontally above a particular point on the ground, the user must center both planar bubble level 912 and point of interest marker 902 within central crosshair 914 as shown in FIG. 9B.

Figure 9B:
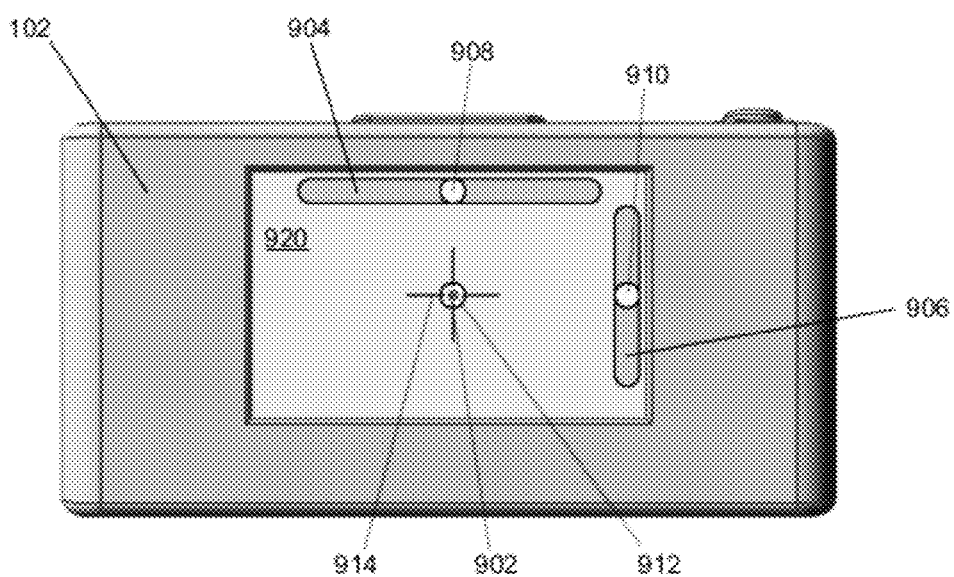
FIG. 9B illustrates another exemplary view of the display screen of a GNSS handheld device oriented horizontally and above a point of interest.

FIG. 9B illustrates another exemplary view 920 of display 112. In this example, virtual linear bubble levels 904 and 906 are shown with their respective virtual bubbles 908 and 910 centered, indicating that the device is horizontal. As such, planar bubble level 912 is also centered within central crosshair 914. Additionally, in this example, point of interest marker 902 is shown as centered within central crosshair 914. This indicates that optical axis 242 of front camera lens 110 is pointing towards point of interest marker 902. Thus, in the example shown by FIG. 9B, handheld GNSS device 100 is positioned horizontally above point of interest marker 902.

The bottom camera lens 116 or front camera lens 110 can be used to record images of a marker of a known configuration, a point of interest, placed on the ground. In one application, pixels and linear dimensions of the image are analyzed to estimate a distance to the point of interest. Using a magnetic compass or a MEMS gyro in combination with two horizon angles allows the three dimensional orientation of the GNSS handheld device 100 to be determined. Then, the position of the point of interest may be calculated based upon the position of the GNSS antenna 802 through trigonometry. In one embodiment, a second navigation antenna is coupled to the housing 102 of the GNSS handheld device 100 via an external jack 804 (FIG. 8). The second navigation antenna can be used instead of magnetic compass to complete estimation of full three-dimensional attitude along with two dimensional horizon sensors.

Estimation of a distance to a point of interest can be estimated as described in U.S. patent application Ser. No. 12/571, 244, which is incorporated herein by reference for all purposes. The bottom camera lens 116 may also be used. The measurement is reduced to the calculation of the intersection of at least three cones using equations and methods described in Appendices A, B, and C to this application.

If the optical axis of the camera is not pointing directly at the point of interest, the misalignment with the survey mark can be recorded and compensated by analyzing the recorded image bitmaps.

Figure 10:
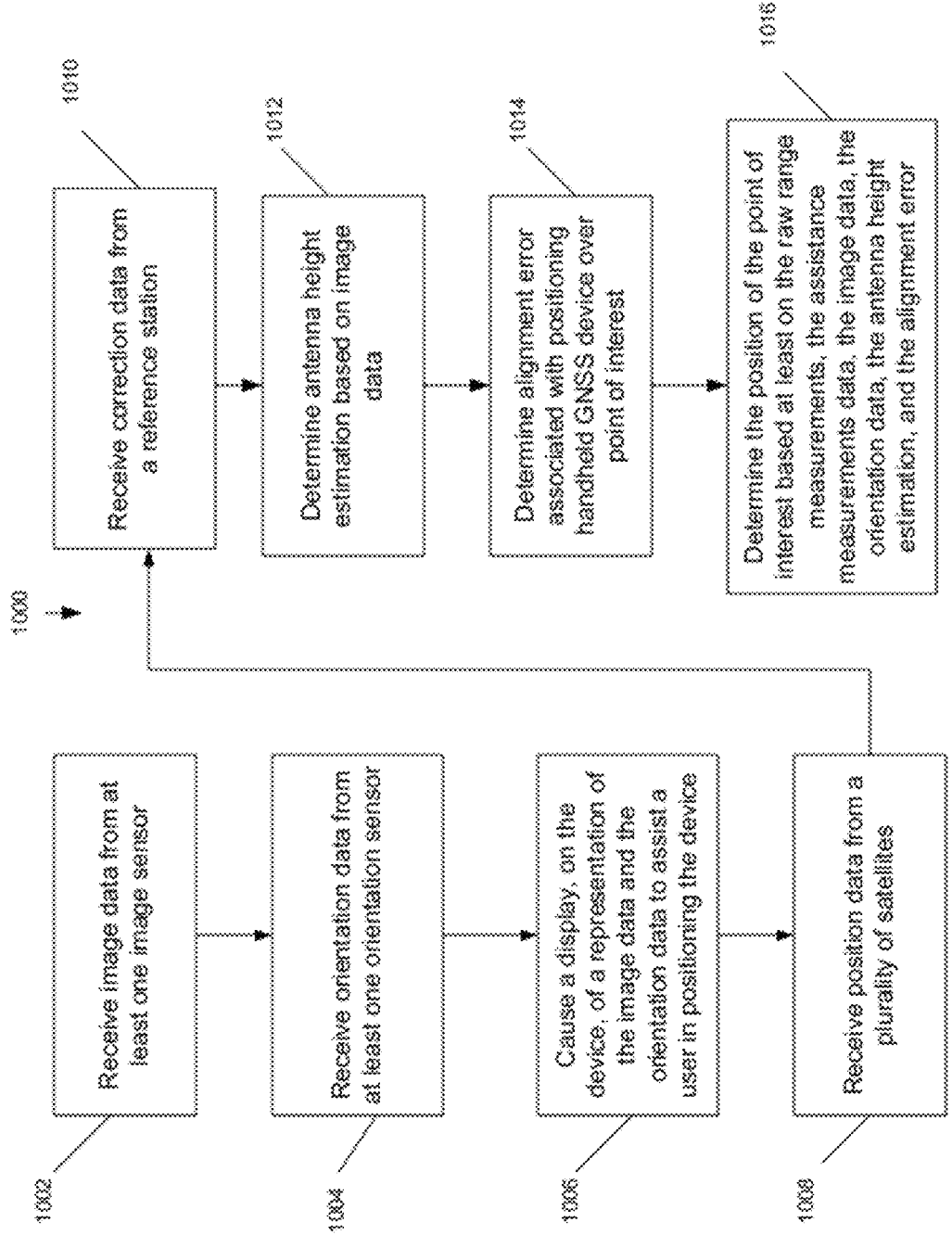
FIG. 10 illustrates a flowchart of a method for measuring position using a handheld GNSS device according to embodiments of the invention.

FIG. 10 illustrates an exemplary process 1000 for determining the position of a point of interest using a handheld GNSS device 100 according to embodiments of the invention. With reference to FIG. 1, a user will position the handheld GNSS device 100 such that an image sensor, such as front camera lens 110, obtains image data of the point of interest at 1002. Orientation data is received from an orientation sensor of the handheld GNSS device at 1004. The image data and the orientation data are displayed on the display 112, such that the user may position the handheld GNSS device 100 to accurately determine the position of the point of interest at 1006.

The user may position the handheld GNSS device 100 as in the example shown in FIGS. 9A and 9B.

When the handheld GNSS device 100 is positioned to accurately determine the position of the point of interest, position data may be received by the GNSS antenna 802 at 1008. Positioning assistance data is also received at 1010 by at least one communication antenna 806.

The antenna height of the GNSS antenna 802 is a factor in determining the position data of a point of interest marker. The point of interest marker position determination takes into account the antenna height in order to determine a more accurate position of the point of interest. The optical axis of the bottom camera lens 116 goes through GNSS antenna. After the bottom camera lens 116 records image data of the point of interest marker, at 1012, the antenna height is estimated based on analyzing the image data. For example, by analyzing the size of the point of interest marker in the image, a height of the GNSS antenna 802 can be estimated.

Further, a misalignment of the handheld GNSS device 100 may add to an error in position determination of the point of interest marker. The user using the handheld GNSS device 100 may not have aligned the handheld GNSS device 100 with the point of interest marker exactly, which could affect the accuracy of the position determination of the point of interest. As such, at 1014, an alignment error associated with the handheld GNSS device 100 in relation to the point of interest is determined.

Then, at 1016, the position data associated with the point of interest is determined using at least the image data, the orientation data, the position data, the position assistance data, the antenna height estimation, and the alignment error.

Figure 11:
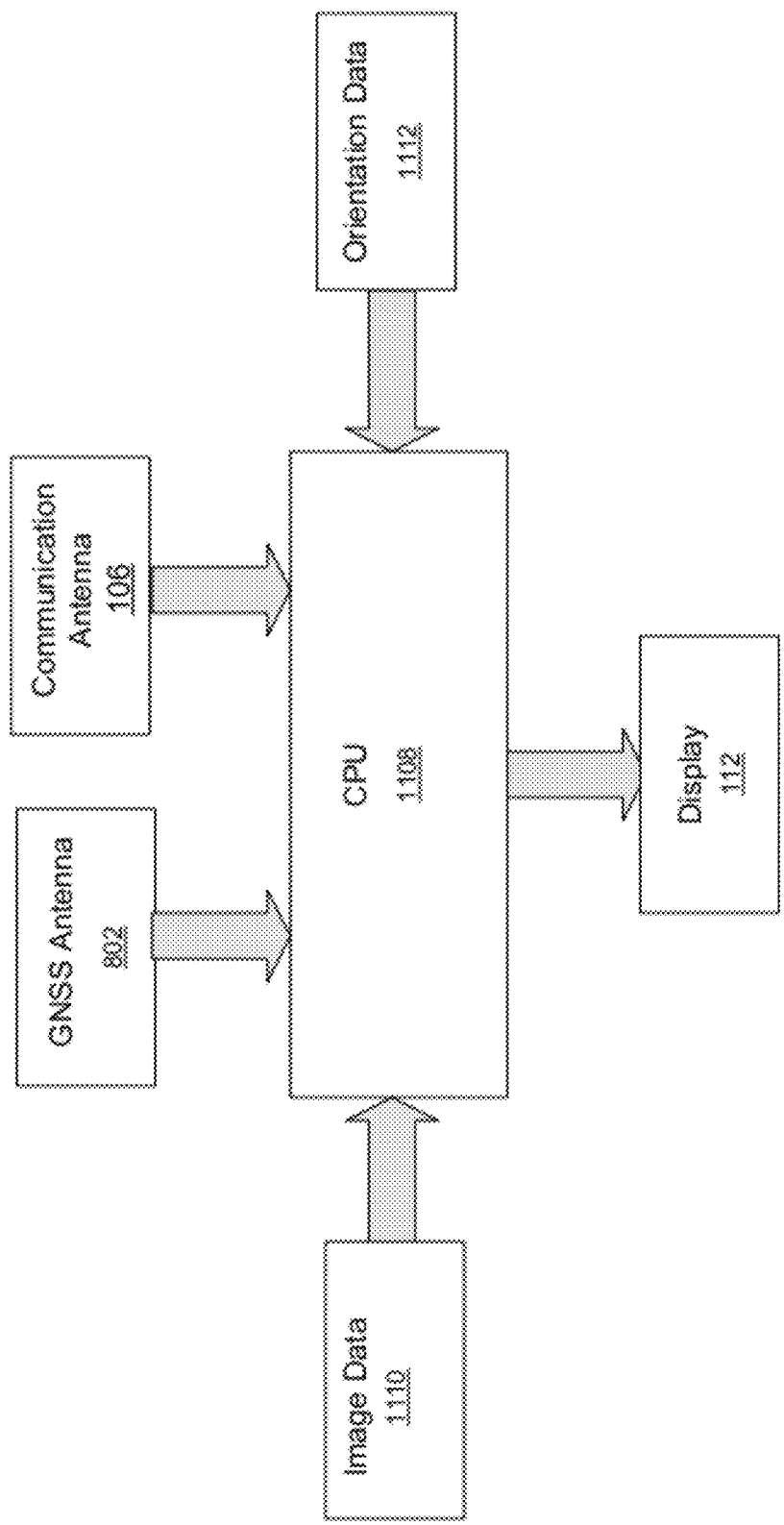
FIG. 11 illustrates a logic diagram showing the relationships between the various components of a handheld GNSS device according to embodiments of the invention.

FIG. 11 illustrates an exemplary logic diagram showing the relationships between the various components of handheld GNSS device 100. In one example, GNSS antenna 802 may send position data received from GNSS satellites to receiver 808. Receiver 808 may convert the received GNSS satellite signals into Earth-based coordinates, such as WGS84, ECEF, ENU, and the like. GNSS receiver 808 may further send the coordinates to CPU 1108 for processing along with position assistance data received from communication antennas 806. Communication antennas 806 are connected to a communication board 810. Orientation data 1112 may also be sent to CPU 1108. Orientation data 1112 may include pitch data from pitch horizon sensors and roll data from roll horizon sensors, for example. Image data 1110 from video or still camera may also be sent along to the CPU 1108 with the position data received by the GNSS antenna 802, positioning assistance data received by communication antenna 106, and orientation data 1112. Distance data from a distance sensor may also be used by CPU 1108. CPU 1108 processes the data to determine the position of the point of interest marker and provides display data to be displayed on display 112.

FIG. 12 illustrates an exemplary computing system 1200 that may be employed to implement processing functionality for various aspects of the current technology (e.g., as a GNSS device, receiver, CPU 1108, activity data logic/database, combinations thereof, and the like.). Those skilled in the relevant art will also recognize how to implement the current technology using other computer systems or architectures. Computing system 1200 may represent, for example, a user device such as a desktop, mobile phone, geodesic device, and so on as may be desirable or appropriate for a given application or environment. Computing system 1200 can include one or more processors, such as a processor 1204. Processor 1204 can be implemented using a general or special purpose processing engine such as, for example, a microprocessor, microcontroller or other control logic. In this example, processor 1204 is connected to a bus 1202 or other communication medium.

Computing system 1200 can also include a main memory 1208, such as random access memory (RAM) or other dynamic memory, for storing information and instructions to be executed by processor 1204. Main memory 1208 also may be used for storing temporary variables or other intermediate information during execution of instructions to be executed by processor 1204. Computing system 1200 may likewise include a read only memory ("ROM") or other static storage device coupled to bus 1202 for storing static information and instructions for processor 1204.

The computing system 1200 may also include information storage mechanism 1210, which may include, for example, a media drive 1212 and a removable storage interface 1220. The media drive 1212 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 1218 may include, for example, a hard disk, floppy disk, magnetic tape, optical disk, CD or DVD, or other fixed or removable medium that is read by and written to by media drive 1212. As these examples illustrate, the storage media 1218 may include a computer-readable storage medium having stored therein particular computer software or data.

In alternative embodiments, information storage mechanism 1210 may include other similar instrumentalities for allowing computer programs or other instructions or data to be loaded into computing system 1200. Such instrumentalities may include, for example, a removable storage unit 1222 and an interface 1220, such as a program cartridge and cartridge interface, a removable memory (for example, a flash memory or other removable memory module) and memory slot, and other removable storage units 1222 and interfaces 1220 that allow software and data to be transferred from the removable storage unit 1222 to computing system 1200.

Computing system 1200 can also include a communications interface 1224. Communications interface 1224 can be used to allow software and data to be transferred between computing system 1200 and external devices. Examples of communications interface 1224 can include a modem, a network interface (such as an Ethernet or other NIC card), a communications port (such as for example, a USB port), a PCMCIA slot and card, etc. Software and data transferred via communications interface 1224. Some examples of a channel include a phone line, a cellular phone link, an RF link, a network interface, a local or wide area network, and other communications channels.

In this document, the terms "computer program product" and "computer-readable storage medium" may be used generally to refer to media such as, for example, memory 1208, storage media 1218, or removable storage unit 1222. These and other forms of computer-readable media may be involved in providing one or more sequences of one or more instructions to processor 1204 for execution. Such instructions, generally referred to as "computer program code" (which may be grouped in the form of computer programs or other groupings), when executed, enable the computing system 1200 to perform features or functions of embodiments of the current technology.

In an embodiment where the elements are implemented using software, the software may be stored in a computer-readable medium and loaded into computing system 1200 using, for example, removable storage drive 1222, media drive 1212 or communications interface 1224. The control logic (in this example, software instructions or computer program code), when executed by the processor 1204, causes the processor 1204 to perform the functions of the technology as described herein.

It will be appreciated that, for clarity purposes, the above description has described embodiments with reference to different functional units and processors. However, it will be apparent that any suitable distribution of functionality between different functional units, processors, or domains may be used. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Furthermore, although individually listed, a plurality of means, elements, or method steps may be implemented by, for example, a single unit or processor. Additionally, although individual features may be included in different claims, these may possibly be advantageously combined, and the inclusion in different claims does not imply that a combination of features is not feasible or advantageous. Also, the inclusion of a feature in one category of claims does not imply a limitation to this category, but rather the feature may be equally applicable to other claim categories, as appropriate.

Although a feature may appear to be described in connection with a particular embodiment, one skilled in the art would recognize that various features of the described embodiments may be combined. Moreover, aspects described in connection with an embodiment may stand alone.

APPENDIX A

Unconstrained Minimization Methods

Let:

$R^n$ be n-dimensional Euclidean space, $x=(x_1, x_2, \ldots, x_n)^T \in R^n$, where vectors are columns and the symbol $T$ denotes transpose;

$$\|x\| = \sqrt{x_1^2 + x_2^2 + \ldots + x_n^2}$$

be an Euclidean norm of the vector $x=(x_1, x_2, \ldots, x_n)^T \in R^n$;

$$\langle x, y \rangle = x^T y = y^T x$$

be scalar product of two vectors;

$$\frac{\partial f(x)}{\partial x}$$

be the vector of first partial derivatives of the continuously differentiable function $f(x)$, or the gradient vector;

$$\frac{\partial^2 f(x)}{\partial x^2}$$

be the matrix of second partial derivatives of the twice continuously differentiable function $f(x)$, or the Hesse matrix;

$R^{n \times n}$ be the space of square n×n matrices;

I be the identity matrix.

The sequence $\{x^{(k)}\}$, k=0, 1, ..., starting with initial approximation $x^{(0)}$, generated by the following equation $$x^{(k)} = x^{(k-1)} - \lambda^{(k)} B^{(k)} \frac{\partial f(x^{(k-1)})}{\partial x} \tag{A1}$$

which satisfies the minimization property $$f(x^{(k)}) < f(x^{(k-1)}) < \ldots < f(x^{(0)}) \tag{A2}$$

if the matrix $B^{(k)} \in R^{n \times n}$ is positive definite and the step length $\lambda^{(k)}$ is specially chosen. Methods for calculation of the step length are described, for example, in P. E. Gill, W. Murray, M. H. Wright (1980), *Practical Optimization*, Academic Press, 1981 pp. 100-102, which is incorporated herein by reference. Robust and practically proven methods include calculating the first number in the sequence $$\left\{\lambda_i = \frac{1}{2^i}\right\}, i = 0, 1, 2, \ldots,$$

satisfying the inequality $$f(x^{(k-1)} - \lambda_i p^{(k)}) - f(x^{(k-1)}) < \mu \lambda_i \left\langle p^{(k)}, \frac{\partial f(x^{(k-1)})}{\partial x} \right\rangle, \tag{A3}$$

where $$p^{(k)} = -B^{(k)} \frac{\partial f(x^{(k-1)})}{\partial x}, \tag{A4}$$

is the search (or descent) direction vector, and μ is an arbitrary number in the range 0<μ≤0.5. In one example, the value μ=0.01 may be used.

The sequence $\{x^{(k)}\}$ generated according to the expression (A1) minimizes the function $f(x)$ as shown in inequalities (A2). Thus, the equation (A1) recursively generates the minimizing sequence for any positively definite matrices chosen. The convergence properties of the sequence depend on the choice of the positive definite matrix $B^{(k)}$. The following are methods that may be used to select the positive definite matrix $B^{(k)}$ and calculate the equation (A1):

1) If $B^{(k)} = I$, the equation (A1) may be calculated using the gradient or steepest descent method. The method is known to be linearly convergent.

2) If $$B^{(k)} = \left(\frac{\partial^2 f(x^k)}{\partial x}\right)^{-1},$$

the equation (A1) maybe calculated using the Newton method. The method is quadratic convergent in the neighborhood of the local minimum point where the Hesse matrix is positive definite.

3) The iteratively calculated matrices $B^{(k)}$ may be updated according to the Broyden-Fletcher-Goldfarb-Shanno (BFGS) or Davidon-Fletcher-Powell (DFP) schemes as described, for example, in P. E. Gill, W. Murray, M. H. Wright (1980), *Practical Optimization*, Academic Press, 1981, pp. 116-127, which is incorporated herein by reference. The BFGS and DFP schemes form the Quasi-Newton family of methods which are known to be super-linearly convergent. These methods are practically as fast as Newton methods, but do not demand calculation of the Hesse matrix. In applications where the Hesse matrix is easily calculated, like in the present application, Newton methods are preferable.

APPENDIX B

Sum of Squares Minimization Methods

Let us consider a particular case of the function $f(x)$ subject to minimization. Let the function $f(x)$ be the sum of squares of m functions $\phi_i(x)$:

$$f(x) = \frac{1}{2} \sum_{i=1}^{m} [\varphi_i(x)]^2 \tag{A5}$$

Solution of the redundant (if m≥n) set of nonlinear equations $\phi_1(x)=0,$ $\phi_2(x)=0,$

...

$\phi_m(x)=0, \tag{A6}$ is often reduced to the minimization problem $f(x) \to \min \tag{A7}$ Any of the methods 1)-3) described above can be applied to the problem (A7). To apply the Newton method, the expressions for the gradient vector and Hesse matrix are needed. The following equations express them through gradients and Hesse matrices of the functions $\phi_i(x)$:

$$\frac{\partial f(x)}{\partial x} = \sum_{i=1}^{m} \varphi_i(x) \frac{\partial \varphi_i(x)}{\partial x}, \tag{A8}$$

$$\frac{\partial^2 f(x)}{\partial x^2} = \sum_{i=1}^{m} \frac{\partial \varphi_i(x)}{\partial x} \left[\frac{\partial \varphi_i(x)}{\partial x}\right]^T + \sum_{i=1}^{m} \varphi_i(x) \frac{\partial^2 \varphi_i(x)}{\partial x^2} \tag{A9}$$

If the system (A6) is feasible, the values $\phi_i(x)$ vanish as the minimizing sequence $\{x^{(k)}\}$ converges to the solution. Even if the system (A6) is 'almost' feasible, the values $\phi_i(x)$ can be neglected in the expression for the Hesse matrix (A9). We arrive at the formulation of the fourth method:

4) If $B^{(k)} = \sum_{i=1}^{m} \frac{\partial \varphi_i(x)}{\partial x} \left[\frac{\partial \varphi_i(x)}{\partial x}\right]^T,$ the equation (A1) maybe calculated using the Gauss-Newton method, for example, as described in P. E. Gill, W. Murray, M.

H. Wright (1980), *Practical Optimization*, Academic Press, 1981, pp. 134-136, which is incorporated herein by reference.

APPENDIX C

Let the cone $C_i$ in three dimensional space be defined by its apex $a_i \in R^3$, central axis $h \in R^3$, common for all m cones, and the angle $\delta$ between the axis and the generating line. The vector h is a unit vector aligned with the gravity vector. The equation of the cone $C_i$ takes the form:

$$\frac{\langle h, x - a_i \rangle}{\|h\| \|x - a_i\|} = \cos\delta. \tag{A10}$$

Let us denote $\alpha = \cos\delta$. Then taking into account that the vector h is a unit vector, we arrive at the following equation $$\langle h, x - a_i \rangle - \alpha \|x - a_i\| = 0 \tag{A11}$$

The point $x \in R^3$ belongs to the surface of the cone $C_i$ if and only if it satisfies the equation (A11). The problem of determining the intersection of cones is reduced to the solution of the problem (A6) with $\phi_i(x) = \langle h, x - a_i \rangle - \alpha_i \|x - a_i\|$. The problem is then reduced to the problems (A5) and (A7), which in turn, can be solved by any of the methods 1)-4) described above. To apply, for example, the Newton method, we need to calculate the gradient and Hesse matrix (A8) and (A9), respectively. To complete the description, we derive expressions for $$\frac{\partial \varphi_i(x)}{\partial x}$$

and $$\frac{\partial^2 \varphi_i(x)}{\partial x^2}$$

needed for calculations (A8) and (A9):

$$\frac{\partial \varphi_i(x)}{\partial x} = h - \frac{\alpha_i}{\|x - a_i\|}(x - a_i),$$

$$\frac{\partial^2 \varphi_i(x)}{\partial x^2} = \frac{\alpha_i}{\|x - a_i\|}\left(\frac{1}{\|x - a_i\|^2}(x - a_i)(x - a_i)^T - I\right).$$

What is claimed is:

1. An apparatus for determining position data for a point of interest, comprising:
    a display screen configured to display image data and orientation data to assist a user in positioning the apparatus;
    a GNSS antenna configured to receive position data from a plurality of satellites;
    at least one communication antenna configured to receive positioning assistance data related to the position data from a base station;
    at least one receiver coupled to the GNSS antenna;
    orientation circuitry configured to generate orientation data of the apparatus based upon a position of the apparatus related to the horizon;
    a camera configured to obtain image data concerning the point of interest for display on the display screen; and
    positioning circuitry, coupled to the at least one receiver, the camera, and the orientation circuitry, configured to:
        determine a GNSS antenna height estimation based on a size of the point of interest in the image data;
        determine an alignment error between an optical axis of the camera and the point of interest based on the image data; and
        determine a position for the point of interest based on at least the position data, the positioning assistance data, the orientation data, the GNSS antenna height estimation, and the alignment error between the optical axis of the camera and the point of interest.

2. The apparatus of claim 1, wherein the at least one communication antenna is an antenna selected from a group consisting of: a GSM antenna, a UHF antenna, and a WiFi/Bluetooth antenna.

3. The apparatus of claim 1, wherein the at least one communication antenna comprises three communication antennas.

4. The apparatus of claim 1, wherein the orientation of the GNSS antenna is substantially orthogonal to the display.

5. The apparatus of claim 1, further comprising a GNSS antenna connector for connecting a second GNSS antenna.

6. The apparatus of claim 1, further comprising at least one handgrip, wherein the at least one handgrip enables the user to hold the apparatus at substantially the user's eye level.

7. The apparatus of claim 1, further comprising a monopod connector.

8. The apparatus of claim 1, further comprising a shoulder strap.

9. The apparatus of claim 1, wherein the positioning assistance data includes raw position data of the base station for comparing with the position data received by the GNSS antenna to determine the position of the point of interest.

10. The apparatus of claim 1, wherein the positioning assistance data includes correction data for compensating for errors in the position data in determining the position of the point of interest.

11. The apparatus of claim 1, further comprising at least one handgrip, wherein the at least one handgrip is positioned with respect to the at least one communication antenna to enable a user to grasp the at least one handgrip without substantially interfering with receiving the positioning assistance data by the at least one communication antenna.

12. The apparatus of claim 1, wherein the camera is configured to acquire image data of the point of interest, wherein the image data is stored in a memory.

13. The apparatus of claim 12, wherein the image data includes information about the point of interest to determine orientation and position data of the apparatus.

14. The apparatus of claim 1, further comprising a GNSS antenna cover that is transparent to a GNSS signal.

15. The apparatus of claim 1, wherein the display screen is configured to face the user when the user uses the apparatus.

16. The apparatus of claim 1, further comprising: a headset; a speaker; and a microphone.

17. The apparatus of claim 16, wherein the camera and the microphone begin operating without a user input.

18. The apparatus of claim 17, wherein the microphone is operable for recording voice comments from the user.

19. The apparatus of claim 1, further comprising an orientation indicator for assisting the user in positioning the apparatus relative to the point of interest.

20. The apparatus of claim 1, wherein the image data includes at least one image, and the at least one image represents a view of the point of interest viewed from the apparatus.

21. The apparatus of claim 1, wherein the orientation data represents an orientation of the apparatus with respect to a plane parallel with a horizon.

\* \* \* \* \*